(No Model.) 2 Sheets—Sheet 1.
G. J. B. SKINNER.
DUST AND SHAVINGS COLLECTOR.
No. 515,259. Patented Feb. 20, 1894.
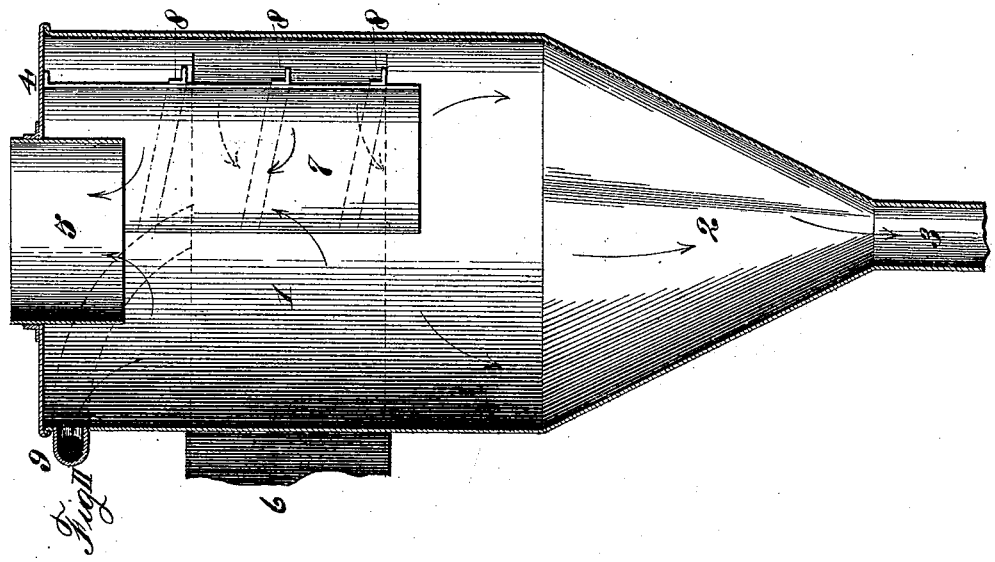
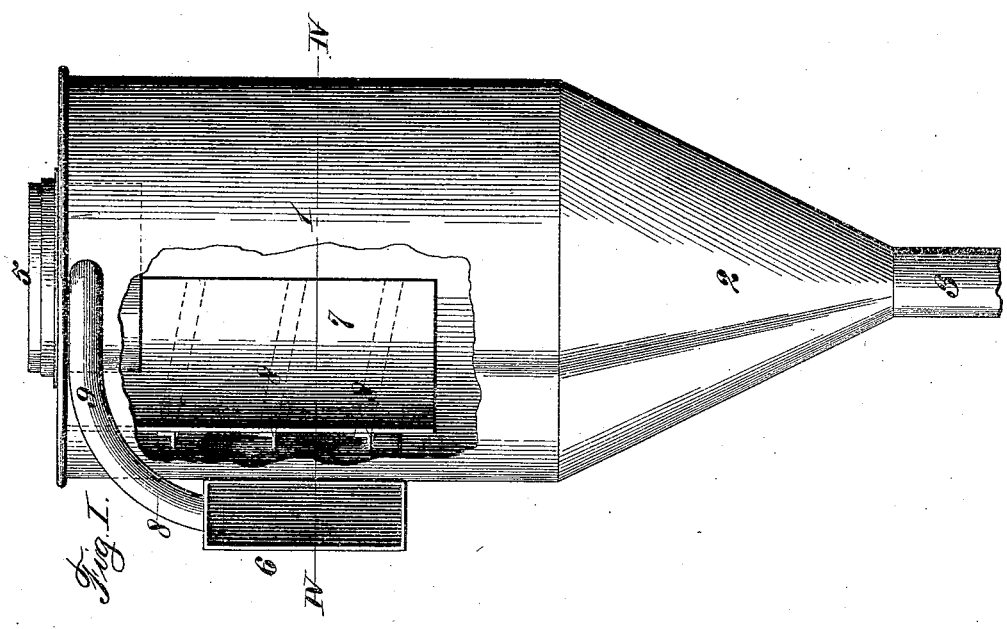
Attest:
A. M. Obersole.
Benj. A. Knight.
Inventor:
George J. B. Skinner,
By Knight Bros
Attys.

(No Model.) 2 Sheets—Sheet 2.
G. J. B. SKINNER.
DUST AND SHAVINGS COLLECTOR.
No. 515,259. Patented Feb. 20, 1894.
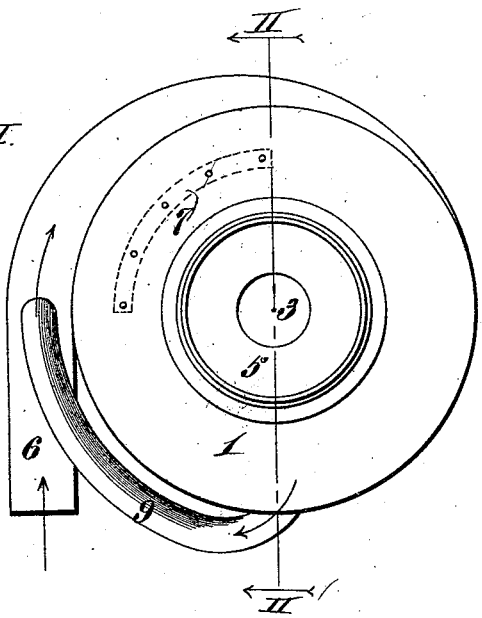
Fig. III.
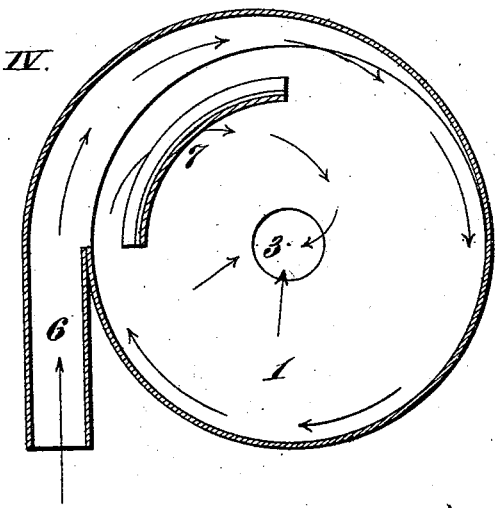
Fig. IV.
Attest:
A. M. Oberole,
Benj. A. Knight.
Inventor
George J. B. Skinner.
by Knight Bros.
Att'ys.

UNITED STATES PATENT OFFICE.

GEORGE J. B. SKINNER, OF ST. LOUIS, MISSOURI.

DUST AND SHAVINGS COLLECTOR.

SPECIFICATION forming part of Letters Patent No. 515,259, dated February 20, 1894.

Application filed June 5, 1893. Serial No. 476,701. (No model.)

*To all whom it may concern:*

Be it known that I, GEORGE J. B. SKINNER, of the city of St. Louis, in the State of Missouri, have invented a certain new and useful Improvement in Dust and Shavings Collectors, of which the following is a full, clear, and exact description, reference being had to the accompanying drawings, forming part of this specification.

My invention relates to certain improvements in apparatuses for receiving and collecting dust and shavings from planing mills, and the like, and delivering them into a house or receptacle provided for that purpose, or delivering them to a furnace to be consumed as fuel.

The object of my invention is to construct a collector in such a manner as to allow an equal expansion of air up and down, so as not to cause back pressure in a way to blow the shavings through the top of the cylinder.

My invention further has for its object to afford facilities for the proper control of the air, so as to carry the shavings downward to the discharge end, while the air, after spending its force, passes out at the top of the cylinder.

My invention further has for its object, to provide a collector having facilities for taking the air that may collect in the upper part of the cylinder, back into the receiving mouth, where it mixes with the incoming dust and shavings, and is carried down to the discharge end of the apparatus.

My invention consists in features of novelty hereinafter fully described and pointed out in the claims.

Figure I is a side elevation, illustrative of my improved dust collector, with part of the outer casing broken away. Fig. II is a vertical, longitudinal section, taken on line II—II, Fig. III. Fig. III is a top or plan view; and Fig. IV is a horizontal, transverse section, taken on line IV—IV, Fig. I.

Referring to the drawings, 1 represents a cylinder, having a conical, lower end 2, with which connects the discharge pipe or tube 3. The upper end of the cylinder is closed, as shown at 4, and in this head 4 of the cylinder is inserted an open tube 5.

6 represents the box or flue leading from the blower (not shown) to the cylinder, and through which the dust and shavings enter the cylinder. This flue connects with the cylinder about midway between the top and bottom of the body of the cylinder, as shown in Figs. I and II. By locating the flue at this point, there is an equal up and down pressure of the air within the cylinder; that is to say, the pressure downward substantially counter-balances the pressure upward, so that there are no undue downward or upward currents, as would be the case if the flue connected with the cylinder substantially nearer one end than the other, which would result in a freer escape for the air in one direction than there would be for it in the other direction. Inside of the cylinder, opposite the mouth of the flue 6, is a vertical deflector 7, extending from the top of the cylinder downwardly to a point beneath the lower edge of the flue 6. This deflector is in the form of a segment of a circle, and extends about one-quarter of the way around the cylinder. The air, carrying the dust and shavings, strikes this deflector as it enters the cylinder, and is deflected downwardly by means of inclined ribs 8, on the outer surface of the deflector. The tendency of these ribs is to start the shavings and dust on a downward course, as they enter the cylinder, and the air, as it leaves the edge of the deflector, is free to circulate upwardly through the body of the cylinder, and escape through the tube 5. Were the deflector formed in a full circle, instead of a segment of a circle, the air would have to pass downwardly to the lower end of the deflector, and then, entering the mouth of the deflector, pass upwardly; whereas with my arrangement the deflector serves the function of a complete circle, in that it precipitates the shavings and dust, or starts them in a downward direction, which they maintain, while the air, as soon as it passes the edge of the deflector, at once enters the large, open space of the cylinder, and is free to move upwardly and escape. Some dust is liable to rise with the air, and be collected in the upper part of the cylinder, above the lower end of the tube 5, and to remove this dust and carry it back to the flue 6, so that it will be again discharged into the cylinder, I employ a pipe 9, forming a communication between the upper part of the cylinder, above the lower end of the tube 5, and the flue 6, as shown clearly in Figs. I and III. There is, of course, a downward current of air through this pipe 9, due to the movement of the air through the flue 6, and this downward current of air draws the dust that may collect in the upper part of the cylinder, downwardly into the flue, where it is carried back into the cylinder, and there precipitated by the deflector 7.

I am aware that it is not broadly new to make a dust collector comprised of a cylinder, with a deflector in the form of a tube, located within the cylinder, the dust being discharged into the cylinder through means of a flue, but I am not aware that my form of construction and arrangement has heretofore been used, and What I desire to claim and secure by Letters Patent is—

1. In a dust and shavings collector, the combination of a cylinder having a lower discharge end for the dust and shavings, and a tube at the upper end for the escape of the air, a flue for discharging the air and shavings into the cylinder, a deflector formed in an arc of a circle located concentrically within the cylinder opposite said flue and extending to the top of the cylinder, and being open at the sides and bottom and a series of downwardly inclined ribs secured to the outer surface of said segment for guiding the dust and shavings to the bottom of the flue, substantially as and for the purpose set forth.

2. In a dust and shavings collector, the combination of a cylinder having a discharge lower end for the shavings and dust, and a tube at the upper end for the escape of the air, a deflector located concentrically within the cylinder and extending to the top thereof, said deflector provided with a series of downwardly inclined ribs on its outer surface, a flue for discharging the shavings and air into the central part of the cylinder opposite said deflector, and a pipe 9 forming a communication between the upper end of the cylinder and said flue for conveying the dust in that part of the cylinder to the flue to be again discharged into the cylinder, substantially as and for the purpose set forth.

GEO. J. B. SKINNER.

Witnesses:
CHAS. N. SKINNER,
FRED. A. C. SKINNER.